Dec. 5, 1950   J. CASTLEBERRY   2,532,605
AUTOMOBILE AXLE

Filed March 10, 1947   2 Sheets-Sheet 1

INVENTOR.
Jack Castleberry
BY
Henry L. Jennings
Attorney

Dec. 5, 1950 J. CASTLEBERRY 2,532,605
AUTOMOBILE AXLE

Filed March 10, 1947 2 Sheets-Sheet 2

INVENTOR.
Jack Castleberry
BY
Henry L Jennings
Attorney

Patented Dec. 5, 1950

2,532,605

UNITED STATES PATENT OFFICE 2,532,605

AUTOMOBILE AXLE

Jack Castleberry, Jasper, Ala.

Application March 10, 1947, Serial No. 733,537

6 Claims. (Cl. 301—1)

My present invention relates to a hub and axle assembly and more particularly to an assembly of the character described embodying a full floating axle of the type generally employed with the driving wheels of automobiles or trucks.

In the art to which my invention relates, it has heretofore been customary to transmit rotational force of the axle to the hub through the medium of studs or bolts. Much difficulty has been experienced by this arrangement due to failure of the studs by shearing after varying periods of use. The failure of such studs or bolts generally occurs at the point of connection between the hub and the axle flange or other member transmitting the load from the axle, and the removal of the broken ends left in the hub is both arduous and time consuming. When failure of the studs occurs, it often happens that other parts of the hub and axle are damaged. Further, after relatively short periods of use, the stud or bolt holes in the axle flange or plate become out of round due to wear and the effective relative distance apart of the several holes in the bolt circle changes, thus causing a disproportionate load to be imposed on less than the total number of studs or bolts provided. When new studs or bolts are installed, this condition quickly causes another failure thereof, as some of the studs take more than their proportionate share of the load, thus resulting in overloading all of the studs.

It is accordingly the prime object of my invention to provide a hub and axle assembly in which rotational forces are transmitted between the hub and axle by means of interlocking projections formed on the outer face of the hub and the inner face of the axle flange or plate connected to the axle.

Another object is to provide a hub and axle assembly in which the hub is provided with projections or teeth in the bore adjacent its outer face, and in which the interlocking projections adapted for association therewith and connected to the axle are disposed on the inner side of a flange, integrally formed with the axle, adjacent the perimeter thereof.

A further object is to provide a hub of the character described with which a plurality of different types of axles may be used, the selection of the axle being dependent upon the work to be done by the truck.

Apparatus embodying features of my invention is illustrated in the accompanying drawings forming a part of this application, in which.

Figure 1:
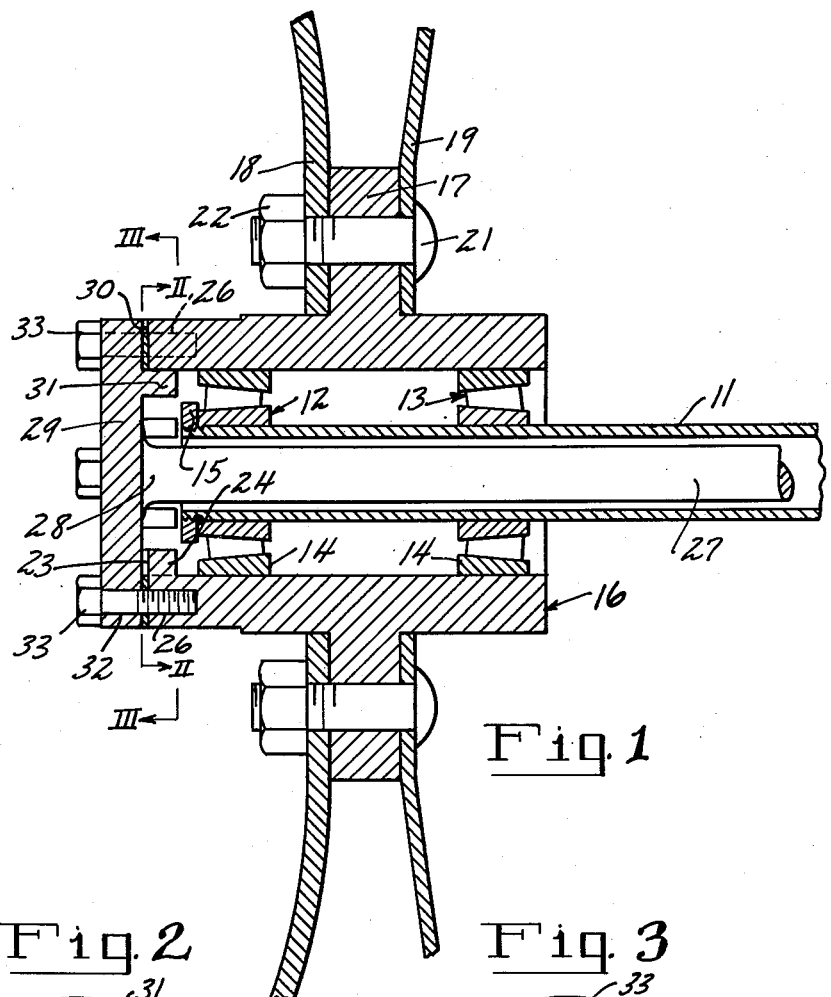
Fig. 1 is a sectional view taken through the hub and axle assembly showing portions of a wheel and brake drum carried thereby.
Figure 2:
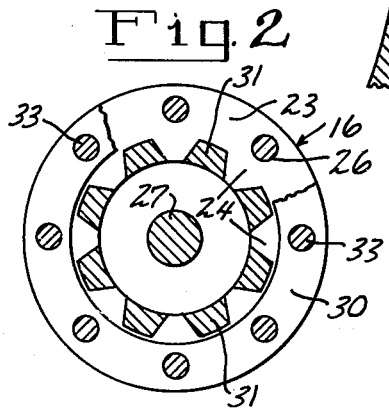
Fig. 2 is a detail sectional view taken along line II—II of Fig. 1.
Figure 3:
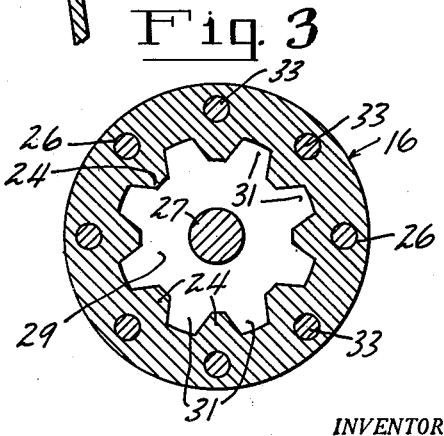
Fig. 3 is a detail sectional view taken along line III—III of Fig. 1.

Referring now more particularly to Figs. 1, 2, and 3, I show my improved hub and axle associated with the outer end of a housing tube 11 which may form a part of the usual differential housing of a truck. Mounted on the housing tube 11 are outer bearings 12 and inner bearings 13, the outer bearing being held in place by means of a nut 15. Rotatably mounted on the outer races 14 of the bearings 12 and 13 is my improved hub 16. The hub 16 is preferably of cylindrical shape and is provided with a boss 17 to which may be secured the central portion 18 of a wheel, and a brake drum 19, bolts 21 and nuts 22 being utilized to hold the same to the boss 17.

The hub 16 is provided in its bore adjacent its outer face 23 with a plurality of projections or teeth 24. As shown in Figs. 2 and 3, the projections 24 project inwardly of the hub, and between the teeth and the perimeter of the hub are drilled and tapped a plurality of holes 26. Disposed within the tubular housing 11 is an axle 27 which may be of the full floating type driven from the differential in the manner well understood. Adjacent its outer end 28, the axle 27 is provided with an integrally formed flange 29 of a diameter approximating the diameter of the hub 16. The flange 29 is provided with radially disposed projections 31 adapted to interlock with the projections 24 formed on the hub 16. It will be noted that the projections 31 are disposed on the inner face of the flange 29, adjacent the periphery thereof. The flange 29 is provided with holes 32 through which pass studs 33, threaded into the openings 26 formed in the hub 16, thus to hold the projections carried by the hub and flange in interlocked relation. A gasket 30 is interposed between the flange 29 and the face of the hub to prevent escape of lubricant, it being understood that means, not shown, are provided to seal the opposite end of the hub against loss of lubricant past the bearing 13.

Figure 4:
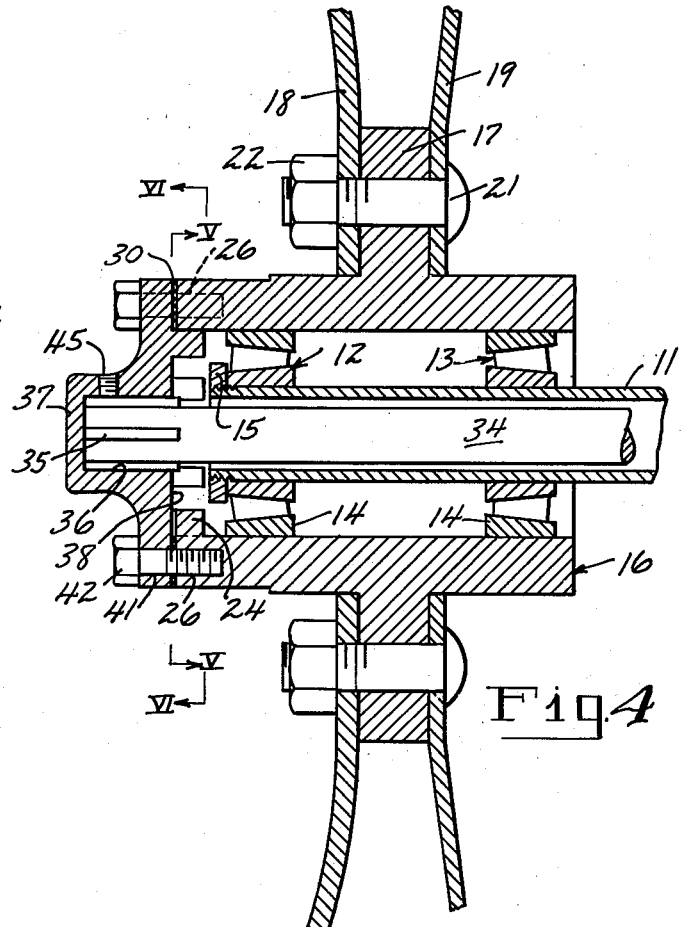
Fig. 4 is a view similar to Fig. 1 and showing a modified form of my invention.
Figure 5:
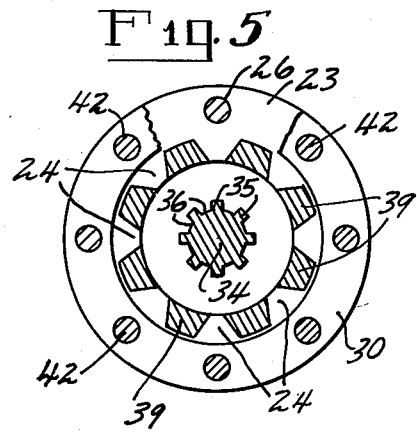
Fig. 5 is a detail sectional view taken along line V—V of Fig. 4.
Figure 6:
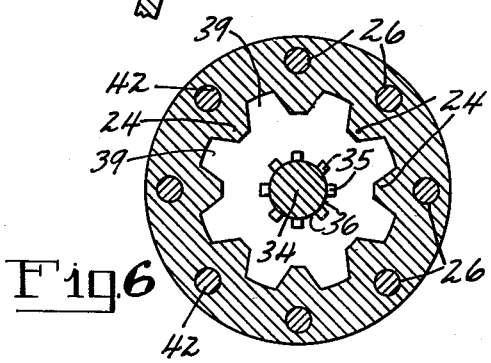
Fig. 6 is a detail sectional view taken along line VI—VI of Fig. 4.

Referring now more particularly to Figs. 4, 5, and 6, I show a modified form of my invention which illustrates a different means for connecting the axle to the hub 16. In this modification the axle 34 is provided on its outer end with splines 35 adapted to interlock with complementary splines 36 formed in the central portion of a connecting plate 37. The plate 37 is provided on its inner face 38 with projections 39 adapted to interlock with the projections 24 formed on the hub 16. The plate 37 also is provided with openings 41 for passing studs 42 which are threaded into the openings 26 provided in the hub 16. A hollow head set screw 45 is threaded through the central boss of the plate 37 and bears against the splined end of the axle 34, thus to prevent endwise shifting of the same. In this modification, it will be seen that the rotational forces from the axle 34 are transmitted to the hub through the splines 35 and 36 and the projections 24 and 39.

Figure 7:
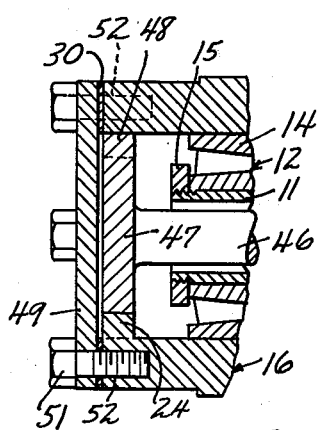
Fig. 7 is a fragmentary detail view illustrating another modification.

In the modification shown in Fig. 7, an axle 46 is provided with an integrally formed flange 47. The flange 47 is provided on its periphery with projections 48, disposed to interlock with the projections 24 on the hub 16. A circular plate 49 is bolted to the face of the hub 16 by means of studs 51, passing through openings 52 in the plate and threaded into the holes 26 in the hub 16. The gasket 30 is utilized to prevent loss of lubricant.

In all of the modifications of my improved assembly shown herein, it will be apparent that the projections or splines or a combination of the two, transmit all of the load between the axles 27, 34 or 46 to the hub 16. The studs 33, 42, and 51 serve merely to hold the parts assembled and take none of the load except in the event of failure in the projections 24 and 31 or 24 and 39 in the modifications shown in Figs. 1 and 4. Likewise, it will be apparent that with the same hub 16, either of the axles 27 or 46 having the flange 29 or 47 formed integrally therewith, or the splined axle 34 and plate 37 may be utilized. Thus, if a truck is equipped with my improved hub 16, an axle having the strength characteristics commensurate with the work to be done may be installed, and if the truck is used on different jobs, axles may be readily changed to suit the conditions without changing hubs. It is further to be noted that in the event of failure of the axles used in either of the modifications shown, my improved driving connection in no way affects the ease with which the axle may be removed and replaced. Further, since the openings between the projections 24 formed in the hub 16 stop short of the outer perimeter thereof, the outer end of the assembly is easily sealed against loss of lubricant by means of the gasket 30.

From the foregoing it will be apparent that I have devised an improved hub and axle assembly which is especially adapted for use with a full floating type of axle, and one in which the shearing of bolts is entirely eliminated. In actual operation I have found that a hub and axle assembly made in accordance with my invention is economical of manufacture and gives long, trouble-free service.

While I have shown my invention in but three forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a hub and axle assembly for a driven wheel, teeth projecting inwardly of the bore of the hub, a flange on the outer end of the axle disposed to cover the outer end of the hub, projections on the inner face of the flange disposed to interlock with the teeth in the hub, a gasket interposed between the end of the hub and the flange, and studs passing through the flange and into the hub to hold the teeth in interlocked relation.

2. In a hub and axle assembly for a driven wheel in which the hub is open at its outer end, projections in the bore of hub adjacent the outer end thereof, a flange formed integrally with the axle and disposed to fit against the outer open end of the hub, projections on the face of the flange adjacent the outer end of the hub and disposed to engage the projections carried in the bore of the hub, a gasket interposed between the outer end of the hub and the flange, and studs passing through the flange and threaded into the end of the hub for holding the projections in interlocked relation.

3. In an assembly of the character described embodying a cylindrical hub and a full floating axle, inwardly projecting teeth formed in the bore of the hub adjacent the outer end thereof, a flange formed integrally with the axle and disposed with its inner face abutting the outer end of the hub, an annular gasket interposed between the outer end of the hub and the flange, teeth formed on the side of the flange adjacent the hub and disposed to project into the hub and interlock with the teeth in the bore of the hub, and studs passing through the flange and gasket into the end of the hub and holding the flange and hub teeth in interlocked relation.

4. In a hub and axle assembly embodying an axle of the full floating type, splines on the outer end of the axle, inwardly disposed projections in the bore of the hub adjacent the outer face thereof, a plate disposed to seal the outer end of the hub against the egress of lubricant from the hub and having projections thereon interlocked with the projections in the hub, there being a centrally disposed opening in said plate provided with internally projecting splines adapted to interlock with the splines on the end of the axle, and studs holding the plate in lubricant sealing relation against the outer face of the hub with the projections carried by the hub and plate in interlocked relation.

5. In an assembly of the character described embodying a cylindrical bored hub and a full floating axle, a flange formed on the outer end of the axle and diposed to fit in the bore of the hub, projections formed on the periphery of the flange, projections formed in the bore of the hub and adapted to interlock with the projections on the periphery of the flange, a plate for covering the end of the hub, a gasket interposed between the plate and the hub, and studs passing through the plate and into the end of the hub for holding the parts assembled.

6. An assembly as defined in claim 5 in which said plate for covering the end of the hub is formed integrally with the flange and axle.

JACK CASTLEBERRY.

REFERENCES CITED

The following references are of record in the file of this patent:

UNITED STATES PATENTS

| Number | Name | Date |
|---|---|---|
| 1,001,697 | Sharp | Aug. 29, 1911 |
| 1,272,565 | Sullivan | July 16, 1918 |
| 1,451,267 | Masury | Apr. 10, 1923 |
| 2,025,834 | Tautz | Dec. 31, 1935 |
| 2,052,524 | Baker | Aug. 25, 1936 |